US011767418B2

(12) United States Patent
Kobe et al.

(10) Patent No.: US 11,767,418 B2
(45) Date of Patent: Sep. 26, 2023

(54) RUBBER COMPOSITION

(71) Applicant: KAO CORPORATION, Tokyo (JP)

(72) Inventors: Ryosuke Kobe, Wakayama (JP); Koichi Kawamoto, Tokyo (JP)

(73) Assignee: KAO CORPORATION, Tokyo (JP)

( * ) Notice: Subject to any disclaimer, the term of this patent is extended or adjusted under 35 U.S.C. 154(b) by 281 days.

(21) Appl. No.: 17/295,133

(22) PCT Filed: Nov. 22, 2019

(86) PCT No.: PCT/JP2019/045843
§ 371 (c)(1),
(2) Date: May 19, 2021

(87) PCT Pub. No.: WO2020/110957
PCT Pub. Date: Jun. 4, 2020

(65) Prior Publication Data
US 2022/0002525 A1      Jan. 6, 2022

(30) Foreign Application Priority Data

Nov. 30, 2018    (JP) ................. 2018-225132

(51) Int. Cl.
 C08L 9/06        (2006.01)
 A43B 13/22       (2006.01)
 A43B 13/04       (2006.01)
 B60C 1/00        (2006.01)

(52) U.S. Cl.
 CPC .............. C08L 9/06 (2013.01); A43B 13/04 (2013.01); A43B 13/22 (2013.01); B60C 1/0016 (2013.01); *C08L 2205/025* (2013.01); *C08L 2205/03* (2013.01); *C08L 2312/08* (2013.01)

(58) Field of Classification Search
 CPC .................................. C08L 9/06; A43B 13/22
 USPC ........................................................ 523/150
 See application file for complete search history.

(56) References Cited

U.S. PATENT DOCUMENTS

2010/0009105 A1    1/2010  Yamagishi et al.
2018/0142088 A1    5/2018  Kawamoto et al.

FOREIGN PATENT DOCUMENTS

| CN | 104130471 | * | 11/2014 |
| CN | 104130471 | A | 11/2014 |
| CN | 106700164 | A | 5/2017 |
| EP | 3012291 | B1 | 8/2018 |
| JP | 48-10615 | B1 | 4/1973 |
| JP | S58-79036 | A | 5/1983 |
| JP | H04-4336 | B | 1/1992 |
| JP | 2001072801 | A | 3/2001 |
| JP | 2001316522 | A | 11/2001 |
| JP | 2007031578 | A | 2/2007 |
| JP | 2007056069 | A | 3/2007 |
| JP | 2010059327 | A | 3/2010 |
| JP | 2013087185 | A | 5/2013 |
| JP | 2015013956 | A | 1/2015 |
| JP | 2015086257 | A | 5/2015 |
| JP | 2016204664 | A | 12/2016 |
| RU | 2009125568 | A | 1/2011 |
| WO | WO-2018079594 | A1 | 5/2018 |

OTHER PUBLICATIONS

S.K. Jagadale et al., "Use of Lignin in Rubber Industry: A Review", GE-International Journal of Engineering Research, vol. 3, Issue 9, Sep. 2015, pp. 8-12.
International Search Report dated Feb. 4, 2020 in PCT/JP2019/045843 (with English translation), 6 pages.
U.S. Appl. No. 16/344,550, filed Apr. 24, 2019, US20200048438A1, Koichi Kawamoto.
U.S. Pat. No. 10,717,852, Jul. 21, 2020, US20180142088A1, Koichi Kawamoto.

* cited by examiner

*Primary Examiner* — Deve V Hall
(74) *Attorney, Agent, or Firm* — Element IP, PLC

(57) ABSTRACT

The present invention relates to a rubber composition with an excellent grip force; a method of producing the rubber composition; a shoe sole, a shoe, and a tire each using the rubber composition; and a method of improving a frictional force of a rubber component.
The present invention is concerned with [1] a rubber composition containing a rubber component (A), a lignin degradation product (B), and a specified amine compound (C); [2] a rubber composition composed of a blend of a rubber component (A), a lignin (B), and a specified amine compound (C); [3] a shoe sole using the aforementioned rubber composition; [4] a shoe having the aforementioned shoe sole; [5] a tire using the aforementioned rubber composition; [6] a method of producing a rubber composition, including blending a rubber component (A), a lignin (B), and a specified amine compound (C) and vulcanizing the blend; and [7] a method of improving a frictional force of a rubber component, including blending a rubber component (A), a lignin (B), and a specified amine compound (C).

10 Claims, No Drawings

RUBBER COMPOSITION

FIELD OF THE INVENTION

The present invention relates to a rubber composition; a method of producing the rubber composition; a shoe sole, a shoe, and a tire each using the rubber composition; and a method of improving a frictional force of the rubber component.

BACKGROUND OF THE INVENTION

Rubber compositions are widely used for industrial applications and are required to have various characteristics.

For example, with respect to shoe soles and tires, in order to enhance strength, abrasion resistance, grip force, and so on, rubber compositions having a filler, such as silica and carbon black, blended therein are widely used.

With respect to the improvement of the grip force of shoe soles and tires, various proposals have been made.

For example, JP 4-4336 B (PTL 1) discloses a production method of a lignin-containing rubber composition in which when heating a rubber composition containing a copolymer of 1-chlorobutadiene and butadiene, a lignin, and a hydroxy group-terminated liquid rubber, it is crosslinked using an isocyanate compound, a tertiary amine, sulfur, and a vulcanization accelerator and describes cyclic diazabicycloundecene and the like as the tertiary amine.

JP 2010-59327 (PTL 2) discloses a rubber composition in which an amine-based anti-aging agent, such as phenylenediamine, and a polyphenol-based compound are blended in a diene-based rubber component and a pneumatic tire using the foregoing rubber composition.

WO 2018/79594 A (PTL 3) discloses a rubber composition containing (A) a rubber component, (B) a lignin degradation product having an aldehyde yield, according to an alkaline nitrobenzene oxidation method, of 12% by mass or more, and (C) an anti-aging agent, such as a bisphenol-based compound and an aromatic secondary amine-based compound, and a shoe sole using the foregoing rubber composition.

SUMMARY OF THE INVENTION

The present invention relates to a rubber composition containing a rubber component (A), a lignin (B), and a specified amine compound (C); a method of producing the rubber composition; a shoe sole, a shoe, and a tire each using the rubber composition; and a method of improving a frictional force of the rubber component.

DETAILED DESCRIPTION OF THE INVENTION

For example, on a wet road surface, the slip prevention owing to grooves or an irregular pattern to be provided in outsoles of shoe bottoms or tires is limitative. Accordingly, rubber compositions with a more excellent grip force are demanded.

According to the conventional technologies of the aforementioned PTLs 1 to 3 and so on, there was room for improving the grip force against the road surface wetted with a rain or the like.

The present invention relates to a rubber composition with an excellent grip force; a method of producing the rubber composition; a shoe sole, a shoe, and a tire each using the rubber composition; and a method of improving a frictional force of a rubber component.

The present inventors have found that by blending a rubber component with a lignin and a specified amine compound, the grip force of the rubber composition can be improved.

Specifically, the present invention is concerned with the following [1] to [7].

[1] A rubber composition containing a rubber component (A), a lignin (B), and an amine compound (C) represented by the following general formula (1).

In the formula, $R^1$ represents a hydrocarbon group or an acyl group each having 8 or more and 22 or less carbon atoms; $Z^1$ represents a single bond, $-OR^4-$, or $-NHR^5-$; $R^2$ represents a hydrocarbon group having 1 or more and 22 or less carbon atoms or $-(R^6O)_mH$; $R^3$ represents a hydrocarbon group having 1 or more and 4 or less carbon atoms or $-(R^7O)_nH$, provided that when $Z^1$ is a single bond, then $R^1$ is a hydrocarbon group; and $R^4$ and $R^5$ each independently represent an alkanediyl group having 2 or more and 6 or less carbon atoms; $R^6$ and $R^7$ each independently represent an alkanediyl group having 2 or more and 4 or less carbon atoms; m and n each represent an average addition molar number and are a number of more than 0; and (m+n) represents a number of 1 or more 30 or less.

[2] A rubber composition composed of a blend of a rubber component (A), a lignin (B), and an amine compound (C) represented by the general formula (1).

[3] A shoe sole using the rubber composition as set forth in the above [1] or [2].

[4] A shoe having the shoe sole as set forth in the above [3].

[5] A tire using the rubber composition as set forth in the above [1] or [2].

[6] A method of producing a rubber composition, including blending a rubber component (A), a lignin (B), and an amine compound (C) represented by the general formula (1) and vulcanizing the blend.

[7] A method of improving a frictional force of a rubber component, including blending a rubber component (A), a lignin (B), and an amine compound (C) represented by the general formula (1).

In accordance with the present invention, it is possible to provide a rubber composition with an excellent grip force against the wet road surface; a method of producing the rubber composition; a shoe sole, a shoe, and a tire each using the rubber composition; and a method of improving a frictional force of a rubber component.

[Rubber Composition]

The rubber composition of the present invention contains a rubber component (A), a lignin (B), and an amine compound (C) represented by the following general formula (1).

In addition, the rubber composition of the present invention is a blend of a rubber component (A), a lignin (B), and an amine compound (C) represented by the following general formula (1).

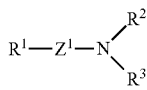

$$R^1-Z^1-N\begin{matrix} R^2 \\ R^3 \end{matrix} \quad (1)$$

In the formula, $R^1$ represents a hydrocarbon group or an acyl group each having 8 or more and 22 or less carbon atoms; $Z^1$ represents a single bond, $-OR^4-$, or $-NHR^5-$; $R^2$ represents a hydrocarbon group having 1 or more and 22 or less carbon atoms or $-(R^6O)_mH$; $R^3$ represents a hydrocarbon group having 1 or more and 4 or less carbon atoms or $-(R^7O)_nH$, provided that when $Z^1$ is a single bond, then $R^1$ is a hydrocarbon group; and $R^4$ and $R^5$ each independently represent an alkanediyl group having 2 or more and 6 or less carbon atoms; $R^6$ and $R^7$ each independently represent an alkanediyl group having 2 or more and 4 or less carbon atoms; m and n each represent an average addition molar number and are a number of more than 0; and (m+n) represents a number of 1 or more 30 or less.

Although the reason why the rubber composition of the present invention is able to exhibit excellent grip properties is not always elucidated yet, the following may be considered.

A factor that governs the grip force (anti-slip force) of rubber is said to include cohesiveness to the ground plane (road surface) and a hysteresis loss (energy loss) owing to rubber deformation. When a lignin is blended in a rubber composition, it may be considered that the cohesiveness is improved against various road surfaces owing to hydrophilic functional groups of the lignin existing in the rubber composition. When a specified amine compound is blended therein, it may be considered that the grip force of the rubber composition can be more improved through a combination of the both components.

Regarding the grip force of the rubber composition, the slipperiness can be evaluated in terms of a maximum static frictional force, and the slip can be evaluated in terms of an average kinematic frictional force.

<Rubber Component (A)>

Examples of the rubber component (A) include a natural rubber and a synthetic rubber, and from the viewpoint of abrasion resistance and so on, at least one selected from a natural rubber and a dienic synthetic rubber is preferably used.

The natural rubber can be used through denaturation, and examples of the denatured natural rubber include an epoxidized natural rubber and a hydrogenated natural rubber.

Examples of the dienic synthetic rubber include a polyisoprene rubber (IR), a polybutadiene rubber (BR), a styrene-butadiene copolymer rubber (SBR), an acrylonitrile-butadiene copolymer rubber (NBR), a chloroprene rubber, and a butyl rubber.

Of these, from the viewpoint of improving the grip force of the rubber composition, at least one selected from a natural rubber, a denatured natural rubber, IR, BR, SBR, and NBR is preferred, at least one selected from BR and SBR is more preferred, and a combination of the both is still more preferred.

The copolymer rubber may be either a block copolymer or a random copolymer, and from the viewpoint of bonding properties in the case of using a silane coupling agent, a random copolymer is preferred.

The rubber component (A) can be used alone or in combination of two or more thereof.

<Lignin (B)>

A natural lignin is a polymer phenolic compound resulting from bonding three kinds of monolignols as monomers through enzymatic reaction and exists in an amount of about 15 to 50% by mass in a biomass.

In this specification, the lignin (B) means both a natural lignin contained in a biomass and a denatured lignin which is separated from a biomass and in which a part of intermolecular bonds of the natural lignin is degraded and condensed.

(Biomass)

Examples of the biomass containing the lignin (B) include plant-based biomasses, such as a herbaceous biomass and a woody biomass, and aquatic environment-derived biomasses, such as an alga and a seaweed. Of these, a plant-based biomass is preferred, and a herbaceous biomass is more preferred.

The herbaceous biomass means a plant raw material growing on the grassland, exclusive of trees, or a non-woody plant part. Specifically, examples thereof include non-woody raw materials, such as gramineous, malvaceous, leguminous plants, cereal hulls and palmaceous plants.

Examples of the gramineous plant include bagasses, such as sugar cane bagasse and sorghum bagasse, corn stover, corn cob, rice straw, wheat straw, barley, switchgrass, napier grass, and *Erianthus arundinaceus*. Examples of the malvaceous plant include kenaf and cotton. Examples of the leguminous plant include alfalfa. Examples of the cereal hull include corn hull, wheat hull, soybean hull, and rice hull. Examples of the palmaceous plant include palm hollow bunch and oil palm bunch.

From the viewpoint of productivity and handling properties, the herbaceous biomass is preferably a gramineous plant, more preferably at least one selected from sugar cane bagasse, corn cob, and rice straw, and still more preferably sugar cane bagasse.

Examples of the woody biomass include various timbers, such as wood chips obtained from conifers, e.g., Japanese larch, Japanese cedar, and Japanese cypress, and broadleaf trees, e.g., oil palm, eucalyptus, and acacia; and wood pulps obtained from these timbers.

The aforementioned biomass containing a natural lignin can be used as a lignin-containing material as mentioned later, and it can also be used as a raw material of the denatured lignin.

The biomass can be used alone or in combination of two or more thereof.

(Denaturation of Lignin)

The main bonding of the natural lignin is a β-O-4 bond. In a process of extracting the lignin from a biomass, degradation of this β-O-4 bond and various condensation reactions between functional groups in the lignin proceed, whereby the bonding composition in the lignin changes. A degree of structural change of the extracted lignin can be expressed based on an aldehyde yield according to an alkaline nitrobenzene oxidation method (hereinafter also referred to simply as "aldehyde yield").

The quantitative determination of the aldehyde yield is a method in which the β-O-4 bond in the natural lignin and the denatured lignin is degraded, and the amount of the β-O-4 bond is quantitatively determined from the formed aldehyde monomer. It is meant that the higher the value, the lower the degree of denaturation is.

As for the alkaline nitrobenzene oxidation method, for example, the alkaline nitrobenzene oxidation method described in "Methods in Lignin Chemistry" (UNI Publishing Co., Ltd., issued in Jul. 10, 1994) can be made hereof by reference. In the present invention, specifically, the aldehyde yield specified by the method described in the section of Examples can be adopted as the aldehyde yield of the lignin (B).

The aldehyde yield of the lignin (B) is preferably 1% by mass or more, more preferably 5% by mass or more, still more preferably 10% by mass or more, yet still more preferably 12% by mass or more, even yet still more preferably 15% by mass or more, even still more preferably 20% by mass or more, and even still more further preferably 23% by mass or more from the viewpoint of enhancing the reactivity with the rubber and improving the grip force of the rubber composition, and it is preferably 60% by mass or less, more preferably 50% by mass or less, still more preferably 40% by mass or less, and yet still more preferably 35% by mass or less from the viewpoint of productivity.

(Other Physical Properties)

From the viewpoint of improving the grip force of the rubber composition, a weight average molecular weight of the lignin (B) is preferably 500 or more, more preferably 1,000 or more, still more preferably 1,200 or more, and yet still more preferably 1,500 or more, and it is preferably 100,000 or less, more preferably 50,000 or less, still more preferably 30,000 or less, yet still more preferably 15,000 or less, even yet still more preferably 10,000 or less, and even still more preferably 5,000 or less.

The measurement of the weight average molecular weight of the lignin can be performed by the method described in the section of Examples.

(Lignin-Containing Material)

In the case of preparing the rubber composition of the present invention, typically, a lignin-containing material containing the lignin (B) as a main component is blended. Here, the wording "containing the lignin (B) as a main component" means that in the solid component of the lignin-containing material, the lignin (B) is contained in an amount of 50% by mass or more, preferably 60% by mass or more, more preferably 70% by mass or more, and still more preferably 80% by mass or more in the components exclusive of cellulose and hemicellulose.

Examples of the lignin-containing material include a biomass containing a natural lignin and a material containing a denatured lignin prepared and separated from a biomass. From the viewpoint of improving the grip force of the rubber composition, a material containing a denatured lignin is preferred.

The content of the lignin (B) in the lignin-containing material (lignin content) is preferably 20% by mass or more, more preferably 50% by mass or more, still more preferably 70% by mass or more, yet still more preferably 80% by mass or more, even yet still more preferably 85% by mass or more, and even still more preferably 90% by mass or more from the viewpoint of blending efficiency and improvement in grip force of the rubber composition.

The measurement of the lignin content in the lignin-containing material can be performed by the method described in the section of Examples.

The sulfur content in the lignin-containing material is preferably 7% by mass or less, more preferably 6% by mass or less, still more preferably 4% by mass or less, yet still more preferably 2% by mass or less, even yet still more preferably 1% by mass or less, and even still more preferably 0.5% by mass or less from the viewpoint of reactivity with the rubber, and it is preferably 0.001% by mass or more, more preferably 0.005% by mass or more, still more preferably 0.01% by mass or more, and yet still more preferably 0.02% by mass or more from the viewpoint of abrasion resistance.

The measurement of the sulfur content in the lignin-containing material can be performed by the method described in the section of Examples.

(Production of Lignin-Containing Material Containing Denatured Lignin)

The lignin-containing material containing a denatured lignin prepared and separated from a biomass is variable with a difference in the separation method, and examples thereof include sulfuric acid lignin, hydrochloric acid lignin, periodic acid lignin, organosolv lignin, thioglycolic acid lignin, lignosulfonic acid, kraft lignin, soda lignin, Brauns natural lignin, milled wood lignin, cellulose saccharification residual lignin, cellulose saccharification and fermentation residual lignin, hydrothermal lignin, steam explosion lignin, PEG lignin, and lignophenol.

From the viewpoint of degrading the biomass under a mild condition and suppressing the condensation reaction to efficiently obtain a low-denatured lignin, it is preferred that the lignin (B) or the lignin-containing material is prepared by the following method A or method B. Details thereof can be, for example, made by reference to WO 2018/79594 A.

[Method A] Method Including the Following Steps (A-1) and (A-2) and Optionally, Further the Following Step (A-3)

Step (A-1): A step of mixing 8 parts by mass or more and 70 parts by mass or less of a basic compound and 10 parts by mass or more and 10,000 parts by mass or less of water relative to 100 parts by mass of the solid component of the biomass and treating the mixture under a condition at an H-factor of 5,000 or less, to obtain a reaction product Step (A-2): A step of separating, as a water-soluble component, a lignin having an aldehyde yield of 5% by mass or more, and preferably 12% by mass or more from the reaction product obtained in the step (A-1)

Step (A-3): A step of obtaining or fractionating a material having a specified molecular weight from the lignin obtained in the step (A-2) as the water-soluble component.

Here, the H-factor is one which has hitherto been used as a control index in a pulp digestion process. In the present invention, the H-factor is an index expressing the total amount of heat given to the reaction system through the treatment of the biomass using the basic compound and is calculated by integrating a time t at which the biomass and the basic compound come into contact with each other.

[Method B]: Method Including the Following Steps (B-1) to (B-3)

Step (B-1): A step of subjecting a biomass to an enzymatic saccharification treatment to obtain a saccharification residue Step (B-2): A step of subjecting the saccharification residue obtained in the step (B-1) to a heat treatment in a solvent containing water and an organic solvent having a solubility in water at 20° C. of 90 g/L or more, to obtain a heat-treated liquid containing a lignin-containing material Step (B-3): A step of subjecting the heat-treated liquid obtained in the step (B-2) to solid-liquid separation to remove insoluble components, thereby obtaining a lignin In the method A and the method B, as mentioned above, the biomass to be used as the raw material is preferably a plant-based biomass, and more preferably a herbaceous biomass.

Although the biomass may be used without being subjected to a milling treatment, especially in the method B, from the viewpoint of treatment efficiency, the biomass is preferably subjected to a milling treatment. Although a milling device to be used is not particularly restricted, from the viewpoint of milling efficiency and productivity, tank-drive medium mills or medium agitating mills are preferred, and vibration mills, such as a vibration ball mill, a vibration rod mill, and a vibration tube mill, are more preferred.

From the viewpoint of industrial use, the material of the medium to be used for milling is preferably iron, stainless steel, zirconia, silicon carbide, or silicon nitride, and the shape thereof is preferably a rod or a ball.

Details of the steps (A-1), (A-2), and (A-3) of the method A are those described in paragraphs [0024] to [0033] of WO 2018/79594 A.

From the viewpoint of improving a recovery rate of the lignin, the basic compound to be used in the step (A-1) is preferably an alkali metal hydroxide or an alkaline earth metal hydroxide, more preferably an alkali metal hydroxide, and still more preferably sodium hydroxide or potassium hydroxide.

In the step (A-1), the H-factor is preferably 0.1 or more, more preferably 0.5 or more, and still more preferably 1 or more, and it is preferably 1,000 or less, more preferably 100 or less, and still more preferably 30 or less. For example, in order to satisfy the H-factor of 3 or more, in the case of performing the heat treatment at 85° C., the treatment time is required to be about 20 hours, and in the case of performing the heat treatment at 100° C., the treatment time is required to be about 4.5 hours.

The treatment temperature and time in the step (A-1) are preferably set up from the viewpoint of a recovery rate of the lignin, shortening of the cycle time, and economy.

The treatment temperature is preferably 50° C. or higher, more preferably 70° C. or higher, and still more preferably 80° C. or higher, and it is preferably 180° C. or lower, more preferably 150° C. or lower, and still more preferably 140° C. or lower.

In the step (A-2), the lignin exists in an aqueous shape portion of the reaction product, and therefore, by separating the solid component of the biomass and the aqueous phase from each other, the lignin can be taken out therefrom. Also, in addition to the taking-out due to the separation, the lignin existing in the solid component (solid phase) of the separated alkali-treated biomass is washed with water and dissolved in water, followed by extraction, whereby it can be taken out.

In the step (A-3), examples of a method of fractionating the lignin into a material having a specified molecular weight include a method of membrane separation using an ultrafiltration membrane, a reverse osmosis membrane, or the like; a method of precipitating a specified lignin by acid addition or addition of an organic solvent; a method of evaporating an organic solvent for solidification, followed by adding an organic solvent to undergo solid-liquid separation (solvent fractionation, etc.); a gel filtration method; and a combination thereof. According to such a method, the weight average molecular weight of the resulting lignin can be appropriately regulated.

From the viewpoint of improvement in extraction efficiency of the lignin and safety, the organic solvent is preferably at least one selected from an alcohol, a nitrile, an ether, and a ketone, and more preferably at least one selected from methanol, ethanol, isopropanol, 2-butanol, and acetone. The organic solvent can also be used in admixture with water.

Details of the steps (B-1), (B-2), and (B-3) of the method B are those described in paragraphs [0034] to [0052] of WO 2018/79594 A.

<Amine Compound (C)>

The rubber composition of the present invention is one having an amine compound (c) represented by the general formula (1) (hereinafter also referred to simply as "amine compound (C)") contained or blended therein.

In the present invention, the amine compound (C) may be contained or blended as a salt thereof, and the rubber composition of the present invention includes such an embodiment, too.

(1)

In the formula, $R^1$ represents a hydrocarbon group or an acyl group each having 8 or more and 22 or less carbon atoms; $Z^1$ represents a single bond, —$OR^4$—, or —$NHR^5$—; $R^2$ represents a hydrocarbon group having 1 or more and 22 or less carbon atoms or —$(R^6O)_mH$; $R^3$ represents a hydrocarbon group having 1 or more and 4 or less carbon atoms or —$(R^7O)_nH$, provided that when $Z^1$ is a single bond, then $R^1$ is a hydrocarbon group; and $R^4$ and $R^5$ each independently represent an alkanediyl group having 2 or more and 6 or less carbon atoms; $R^6$ and $R^7$ each independently represent an alkanediyl group having 2 or more and 4 or less carbon atoms; m and n each represent an average addition molar number and are a number of more than 0; and (m+n) represents a number of 1 or more 30 or less.

From the viewpoint of improving the grip force of the rubber composition, $R^1$ is a hydrocarbon group or an acyl group each having 8 or more and 22 or less carbon atoms, and preferably a hydrocarbon group having 8 or more and 22 or less carbon atoms.

The carbon number of $R^1$ is preferably 10 or more, more preferably 12 or more, and still more preferably 16 or more, and it is 22 or less, preferably 20 or less, and more preferably 18 or less. From the same viewpoint as that mentioned above, the aforementioned carbon number is preferably 10 or more and 22 or less, more preferably 12 or more and 20 or less, still more preferably 16 or 18, and yet still more preferably 18.

From the same viewpoint as that mentioned above, the hydrocarbon group represented by $R^1$ is preferably an aliphatic hydrocarbon group, more preferably an alkyl group, and still more preferably a linear alkyl group. Examples of the linear alkyl group include a dodecyl group, a tetradecyl group, a hexadecyl group, and an octadecyl group.

From the same viewpoint as that mentioned above, the acyl group represented by $R^1$ is preferably an aliphatic acyl group, more preferably an alkanoyl group, and still more preferably a linear alkanoyl group. Examples of the linear alkanoyl group include a dodecanoyl group and an octadecanoyl group.

From the same viewpoint as that mentioned above, $R^1$ is preferably an alkyl group or an alkanoyl group, more preferably a linear alkyl group or a linear alkanoyl group, and still more preferably a linear alkyl group.

In the present invention, the acyl group can be represented by the general formula (2).

$$R^8\text{—CO—} \quad (2)$$

In the formula, $R^8$ represents a hydrocarbon group.

At this time, the aliphatic acyl group refers to an acyl group in which $R^8$ is an aliphatic hydrocarbon group; the alkanoyl group refers to an acyl group in which $R^8$ is an alkyl group; and the linear alkanoyl group refers to an acyl group in which $R^8$ is a linear alkyl group. The carbon number of the acyl group is a number resulting from adding 1 to the carbon number of $R^8$.

$Z^1$ is a single bond, —$OR^4$—, or —$NHR^5$—, and from the viewpoint of improving the grip force of the rubber composition, it is preferably a single bond or —$OR^4$—, and more preferably a single bond.

From the same viewpoint as that mentioned above, in the case where $Z^1$ is a single bond, $R^1$ is a hydrocarbon group From the same viewpoint as that mentioned above, in the case where $Z^1$ is —$OR^4$—, $R^1$ is preferably a hydrocarbon group, and in the case where $Z^1$ is —$NHR^5$—, $R^1$ is preferably an acyl group.

From the same viewpoint as that mentioned above, the carbon numbers of $R^4$ and $R^5$ are each independently 2 or more and 6 or less, preferably 2 or more and 3 or less, and more preferably 3. Specifically, $R^4$ and $R^5$ are each preferably an ethylene group or a propane-1,3-diyl group, and more preferably a propane-1,3-diyl group.

From the same viewpoint as that mentioned above, $R^2$ is a hydrocarbon group having 1 or more and 22 or less carbon atoms or —$(R^6O)_mH$, preferably a hydrocarbon group having 1 or more and 4 or less carbon atoms or —$(R^6O)_mH$, and more preferably a hydrocarbon group having 1 or more and 4 or less carbon atoms.

From the same viewpoint as that mentioned above, the carbon number of the hydrocarbon group represented by $R^2$ is 1 or more and 22 or less, preferably 1 or more and 18 or less, still more preferably 1 or more and 12 or less, yet still more preferably 1 or more and 8 or less, even yet still more preferably 1 or more and 4 or less, even still more preferably 1 or more and 2 or less, and even still more further preferably 1.

From the same viewpoint as that mentioned above, the hydrocarbon group represented by $R^2$ is preferably an aliphatic hydrocarbon group, more preferably an alkyl group, and still more preferably a linear alkyl group. Examples of the linear alkyl group include a methyl group, an ethyl group, a dodecyl group, and an octadecyl group. Of these, a methyl group and an ethyl group are preferred, and a methyl group is more preferred.

From the same viewpoint as that mentioned above, in —$(R^6O)_mH$, the carbon number of $R^6$ is 2 or more and 4 or less, preferably 2 or more and 3 or less, and more preferably 2. $R^6$ is preferably an ethylene group or a propane-1,2-diyl group, and more preferably an ethylene group.

m is a number of more than 0, and from the same viewpoint as that mentioned above, m is preferably 0.5 or more, more preferably 0.7 or more, still more preferably 0.9 or more, and yet still more preferably 1 or more.

From the same viewpoint as that mentioned above, —$(R^6O)_mH$ is preferably a 2-hydroxyethyl group or a hydroxypropyl group, and more preferably a 2-hydroxyethyl group.

From the same viewpoint as that mentioned above, $R^3$ is a hydrocarbon group having 1 or more and 4 or less carbon atoms or —$(R^7O)_nH$, and preferably a hydrocarbon group having 1 or more and 4 or less carbon atoms.

From the same viewpoint as that mentioned above, the carbon number of the hydrocarbon group represented by $R^3$ is 1 or more and 4 or less, preferably 1 or more and 2 or less, and more preferably 1. Specifically, the hydrocarbon group represented by $R^3$ is preferably a methyl group or an ethyl group, and more preferably a methyl group.

From the same viewpoint as that mentioned above, in —$(R^7O)_nH$, the carbon number of $R^7$ is 2 or more and 4 or less, preferably 2 or more and 3 or less, and more preferably 2. $R^7$ is preferably an ethylene group or a propane-1,2-diyl group, and more preferably an ethylene group.

n is a number of more than 0, and from the same viewpoint as that mentioned above, n is preferably 0.5 or more, more preferably 0.7 or more, still more preferably 0.9 or more, and yet still more preferably 1 or more.

From the same viewpoint as that mentioned above, —$(R^7O)_nH$ is preferably a 2-hydroxyethyl group or a hydroxypropyl group, and more preferably a 2-hydroxyethyl group.

From the same viewpoint as that mentioned above, (m+n) is 1 or more, preferably 1.5 or more, more preferably 1.8 or more, and still more preferably 2 or more, and it is 30 or less, preferably 10 or less, more preferably 5 or less, and still more preferably 2.2 or less.

From the same viewpoint as that mentioned above, as for $R^2$ and $R^3$, preferably, the both are a hydrocarbon group having 1 or more and 4 or less carbon atoms, or $R^2$ is —$(R^6O)_mH$, and $R^3$ is —$(R^7O)_nH$; more preferably, the both are a methyl group, an ethyl group, or a 2-hydroxyethyl group; still more preferably, the both are a methyl group or a 2-hydroxyethyl group; and yet still more preferably, the both are a methyl group.

The amine compound (C) is preferably a tertiary amine.

Specific examples of the amine compound (C) include at least one selected from (i) trialkylamines, such as N,N-dimethyldecylamine, N,N-dimethyldodecylamine, N,N-dimethyltetradecylamine, N,N-dimethylhexadecylamine, N,N-dimethyloctadecylamine, and N,N-dioctadecylmethylamine;

(ii) polyoxyethylenealkylamines, such as polyoxyethylene (1-30)dodecylamine and polyoxyethylene (1-30) octadecylamine;

(iii) dialkanolamines, such as dodecyldiethanolamine and octadecyldiethanolamine;

(iv) alkyletheramines, such as N,N-dimethyl-3-hexadecyloxypropylamine and N,N-dimethyl-3-octadecyloxypropylamine;

(v) dialkylaminoalkyl fatty acid esters, such as 2-dimethylaminoethyl dodecanoate and 2-dimethylaminoethyl octadecanoate; and (vi) aminoalkylamides, such as 3-dimethylaminopropyloctadecanamide.

Among the aforementioned specific examples of the amine compound (C), at least one selected from (i) trialkylamines, (iii) dialkanolamines, (iv) alkyletheramines, and (vi) aminoalkylamides is preferred; and at least one selected from (i) trialkylamines and (iv) alkyletheramines is more preferred. Specifically, at least one selected from N,N-dimethyldodecylamine, N,N-dimethyltetradecylamine, N,N-dimethylhexadecylamine, N,N-dimethyloctadecylamine, octadecyldiethanolamine, N,N-dimethyl-3-octadecyloxypropylamine, 3-dimethylaminopropyloctadecanamide, and dioctadecylmethylamine is preferred; and at least one selected from N,N-dimethyldodecylamine, N,N-dimethyltetradecylamine, N,N-dimethylhexadecylamine, N,N-dimethyloctadecylamine, N,N-dimethyl-3-octadecyloxypropylamine, and octadecyldiethanolamine is more preferred.

As mentioned above, the amine compound (C) according to the present invention may also be in a form of salt.

Examples of the salt of the amine compound include an organic acid salt and an inorganic acid salt of the aforementioned amine compound.

Examples of the organic acid salt include a carboxylic acid salt, such as a stearic acid salt and a behenic acid salt, and a sulfonic acid salt; and examples of the inorganic acid salt include a sulfuric acid salt, a hydrochloric acid salt, a nitric acid salt, and a phosphoric acid salt. Of these, a carboxylic acid salt is preferred, and a stearic acid salt is more preferred.

The salt of the amine compound can be obtained by neutralizing the aforementioned amine compound with the aforementioned carboxylic acid salt or the like, or reacting a corresponding secondary amine with an alkylating agent, such as a dialkyl sulfate and an alkyl halide.

The amine compound (C) can be used alone or in combination of two or more thereof.

<Inorganic Filler (D)>

The rubber composition of the present invention, especially the rubber composition for a shoe sole, a shoe, or a tire, is preferably one having an inorganic filler (D) contained or blended therein in order to improve the abrasion resistance, the mechanical strength, and so on. Details of the inorganic filler are those described in paragraph [0074] of WO 2018/79594 A.

From the viewpoint of improving the grip force, the inorganic filler (D) is preferably at least one selected from silica and alumina, and more preferably silica. The silica is preferably a wet-method silica composed mainly of a hydrated silicate.

From the viewpoint of grip properties and abrasion resistance, an average secondary particle diameter of the silica is preferably 10 μm or more, more preferably 15 μm or more, and still more preferably 18 μm or more, and it is preferably 100 μm or less, more preferably 80 μm or less, and still more preferably 50 μm or less.

<Silane Coupling Agent (E)>

The rubber composition of the present invention is preferably one having a silane coupling agent further contained or blended therein. Details of the silane coupling agent are those described in paragraphs [0075] to [0076] of WO 2018/79594 A; a sulfide compound represented by the general formula (8) described in the foregoing patent literature is preferred; at least one tetrasulfide compound selected from bis(3-triethoxysilylpropyl)tetrasulfide, bis(3-trimethoxysilylpropyl)tetrasulfide, bis(3-triethoxysilylethyl)tetrasulfide, and so on is more preferred; and bis(3-triethoxysilylpropyl)tetrasulfide is still more preferred.

<Anti-Aging Agent (F)>

The rubber composition of the present invention is preferably one having an anti-aging agent (F) contained or blended therein from the viewpoint of suppressing a lowering of the grip force of the rubber composition over a long period of time. Examples of the anti-aging agent (F) include a bisphenol-based compound, an aromatic secondary amine-based compound other than the amine compound (C), a hindered phenol-based compound, a monophenol-based compound, a phosphorous acid-based compound, a polyphenol-based compound, a benzimidazole-based compound, a dithiocarbamic acid salt-based compound, a thiourea-based compound, and a quinoline-based compound. Of these, at least one selected from a bisphenol-based compound, a hindered phenol-based compound, and a monophenol-based compound is preferred, and a bisphenol-based compound is more preferred.

Examples of the bisphenol-based compound include 2,2'-methylenebis(4-ethyl-6-tert-butylphenol), 2,2'-methylenebis(4-methyl-6-tert-butylphenol), and 4,4'-butylidenebis(3-methyl-6-tert-butylphenol).

Examples of the hindered phenol-based compound include "IRGANOX 1010", "IRGANOX 1076", and "IRGANOX 1520", all of which are manufactured by BASF SE, and besides, "ADEKASTAB" Series, manufactured by Adeka Corporation.

Examples of the monophenol-based compound include 2,6-di-tert-butyl-4-methylphenol (BHT) and mono- (or di- or tri-)(α-methylbenzyl)phenol.

The anti-aging agent (F) can be used alone or in combination of two or more thereof.

[Rubber Composition]

The rubber composition of the present invention is one having the rubber component (A), the lignin (B), and the amine compound (C) contained or blended therein, and preferably one having at least one selected from the inorganic filler (D), the silane coupling agent (E), and the anti-aging agent (F) further contained or blended therein, as the need arises.

The content of each of the components in the rubber composition is hereunder described, but it should be construed that the foregoing content means both the content and the blending amount.

The content of the rubber component (A) in the rubber composition is preferably 30% by mass or more, more preferably 40% by mass or more, still more preferably 50% by mass or more, and yet still more preferably 55% by mass or more, and it is preferably 90% by mass or less, more preferably 80% by mass or less, still more preferably 75% by mass or less, and yet still more preferably 70% by mass or less.

From the viewpoint of improving the grip force of the rubber composition, the content of the lignin (B) is preferably 0.3 parts by mass or more, more preferably 0.5 parts by mass or more, and still more preferably 0.8 parts by mass or more, and from the viewpoint of suppressing the coloration of the rubber composition, it is preferably 20 parts by mass or less, more preferably 10 parts by mass or less, and still more preferably 5 parts by mass or less, relative to 100 parts by mass of the rubber component (A).

From the same viewpoint as that mentioned above, the content of the amine compound (C) is preferably 0.3 parts by mass or more, more preferably 0.5 parts by mass or more, and still more preferably 0.8 parts by mass or more, and it is preferably 10 parts by mass or less, more preferably 5 parts by mass or less, and still more preferably 3 parts by mass or less, relative to 100 parts by mass of the rubber component (A).

In the case where the amine compound (C) is in a form of salt, it is preferred that the content thereof falls within the aforementioned range on the basis of a value expressed in terms of an amine type compound.

From the same viewpoint as that mentioned above, a mass ratio [(C)/(B)] of the amine compound (C) to the lignin (B) is preferably 0.1 or more and 10 or less. The mass ratio [(C)/(B)] is more preferably 0.2 or more, still more preferably 0.5 or more, and yet still more preferably 0.8 or more, and it is more preferably 8 or less, still more preferably 5 or less, yet still more preferably 3 or less, and even yet still more preferably 2 or less.

In the case where the rubber composition further contains the inorganic filler (D), from the viewpoint of improving the abrasion resistance, the content of the inorganic filler (D) is preferably 10 parts by mass or more, more preferably 20 parts by mass or more, and still more preferably 30 parts by mass or more, and from the same viewpoint, it is preferably 60 parts by mass or less, more preferably 55 parts by mass or less, and still more preferably 50 parts by mass or less, relative to 100 parts by mass of the rubber component (A).

From the same viewpoint as that mentioned above, a mass ratio [{inorganic filler (D)}/{lignin (B)}] of the inorganic filler (D) to the lignin (B) is preferably 2 or more, more preferably 5 or more, and still more preferably 10 or more, and it is preferably 90 or less, more preferably 60 or less, and still more preferably 50 or less.

In the case where the rubber composition further contains the silane coupling agent (E), from the viewpoint of improving the abrasion resistance, the content of the silane coupling agent (E) is preferably 2 parts by mass or more, more preferably 4 parts by mass or more, and still more preferably 6 parts by mass or more, and it is preferably 20 parts by mass or less, more preferably 15 parts by mass or less, and still more preferably 10 parts by mass or less, relative to 100 parts by mass of the inorganic filler (D).

In the case where the rubber composition further contains the anti-aging agent (F), from the viewpoint of keeping the grip force of the rubber composition and improving the abrasion resistance, the content of the anti-aging agent (F) is preferably 0.1 parts by mass or more, more preferably 0.2 parts by mass or more, and still more preferably 0.5 parts by mass or more, and it is preferably 10 parts by mass or less, more preferably 8 parts by mass or less, and still more preferably 5 parts by mass or less, relative to 100 parts by mass of the rubber component (A).

In the rubber component, if desired, various additives which are typically used in the rubber industry field, for example, stearic acid, a process oil, zinc white, a UV absorber, a vulcanizer, a vulcanization accelerator, a scorch retarder, and a softening agent, can be contained or blended within a range where the object of the present invention is not impaired.

The rubber composition of the present invention can be produced by a known method. For example, first, the lignin (B) and the amine compound (C), and optionally, the inorganic filler (D), the silane coupling agent (E), the anti-aging agent (F), stearic acid, a process oil, and the like are kneaded in the rubber component (A) by using a kneading machine, for example, a Banbury mixer, a roll, and an intensive mixer, at a temperature of 165° C. or lower. Subsequently, the vulcanizing agent, the vulcanization accelerator, zinc white, and the like are added thereto and then kneaded at a temperature of 120° C. or lower.

The resulting unvulcanized rubber composition is, according to a known method, processed and molded, and then heated at 130° C. or higher and 180° C. or lower, to provide a vulcanized rubber.

The rubber composition of the present invention is suitable for a shoe sole, a shoe, and a tire. In the case where the rubber composition is used for these applications, in general, it is also preferably crosslinked and then used.

The crosslinking method is not particularly limited, and it may be selected in accordance with the shape, the size, and the like of the crosslinked product. For example, the rubber composition having a crosslinking agent blended therein may be filled in a mold having a shoe sole shape or the like and heated, to achieve crosslinking simultaneously with molding, or the rubber composition having a crosslinking agent blended therein may be previously molded and then heated to achieve crosslinking.

A molding temperature is typically 10° C. or higher and 220° C. or lower, and preferably 25° C. or higher and 120° C. or lower. A crosslinking temperature is typically 120° C. or higher and 200° C. or lower, and preferably 140° C. or higher and 180° C. or lower, and a crosslinking time is typically 1 minute or more and 120 minutes or less, and preferably 3 minutes or more and 60 minutes or less.

[Shoe Sole and Shoe]

The shoe sole of the present invention is characterized by using a rubber composition containing the rubber component (A), the lignin (B), and the amine compound (C), or a rubber composition composed of a blend of the rubber component (A), the lignin (B), and the amine compound (C).

The shoe sole using the rubber composition of the present invention is excellent in the abrasion resistance and the slip resistance, especially the grip force against the wet road surface, and therefore, it can be used as various shoe soles.

The shoe of the present invention has the shoe sole of the present invention.

Examples of the shoe include at least one selected from a sports shoe, a trekking shoe, a climbing shoe, a motorbike shoe, a commuter shoe, a fishing boot, a beach shoe, a diving shoe, a bath shoe, a rain shoe, and so on.

The shoe sole and the shoe of the present invention are suitable especially for a shoe sole and a shoe to be used in the water place.

[Tire]

The tire of the present invention is one using the rubber composition of the present invention.

The tire of the present invention is preferably one in which the rubber composition of the present invention is used for a tire member, such as a tire inner liner, a tread, a tread base, a carcass, a sidewall, and a bead portion. In addition, the tire of the present invention is preferably a studless tire.

The tire of the present invention is produced as a pneumatic tire or the like by molding the rubber composition by a conventional method. For example, the tire can be produced in such a manner that in the unvulcanized stage, the rubber composition of the present invention is extruded as a member for tread, stuck and molded by a conventional method on a tire molding machine to mold a green tire, and the green tire is heated and pressurized in a vulcanizing machine. In this case, the rubber composition can contain a foaming agent. In the case where the rubber composition contains a foaming agent, foaming occurs simultaneously with vulcanization.

[Production Method of Rubber Composition]

In the rubber composition of the present invention, in addition to the rubber component (A), the lignin (B), and the amine compound (C), additives which are typically used in the rubber industry field, for example, an anti-aging agent, a softening agent, stearic acid, zinc white, a vulcanization accelerator, a vulcanization acceleration aid, and a vulcanizer, can be appropriately selected and blended within a range where the effects of the present invention are not hindered.

In addition, the rubber composition of the present invention is obtained by kneading the rubber component (A), the lignin (B), and the amine compound (C), and optionally, various appropriately selected additives by using a kneading machine, such as a roll and an internal mixer, followed by heating, extruding, and so on. After molding processing, vulcanization is performed, whereby the resultant can be used for various applications.

The blending amounts and preferred ranges of the respective components are those mentioned above.

[Method of Improving Frictional Force of Rubber Component]

The present invention also provides a method of improving a frictional force of a rubber component, including blending the rubber component (A) with the lignin (B) and the amine compound (C).

Details of the aforementioned respective components in the method of the present invention are those mentioned above.

In the method of the present invention, in addition to the rubber component (A), the lignin (B), and the amine compound (C), the aforementioned additives for rubber can be blended within a range where the effects of the present invention are not hindered.

EXAMPLES

Preparation Example, Examples, and Comparative Examples are hereunder described. The respective physical properties were measured and evaluated by the following methods.

(1) Calculation of Aldehyde Yield of Lignin by Alkaline Nitrobenzene Oxidation 70 mg of the lignin-containing material, 7 mL of a 2M sodium hydroxide aqueous solution, and 0.4 mL of nitrobenzene were charged into a 20 mL-vial and heated at 170° C. for 2.5 hours while stirring at 900 rpm. After completion of the reaction, the resulting reaction solution was cooled and then extracted with 10 mL of diethyl ether three times, to remove a reduced product of nitrobenzene and an excess amount of nitrobenzene therefrom. Concentrated hydrochloric acid was added to the remaining water layer side to adjust to a pH of 1, and the obtained solution was further extracted with 10 mL of diethyl ether three times. The resulting diethyl ether extraction solution was subjected to distillation under reduced pressure, to obtain an oxidation mixture. The resulting oxidation mixture was diluted with 20 mL of dichloromethane in a measuring cylinder. Then, 2 mL of the obtained solution was filtered through a Millipore HVHP membrane (manufactured by Millipore Japan, pore diameter: 0.45 μm) and subjected to gas chromatography (GC).

The gas chromatography was performed using a GC apparatus (GC-2010 Plus, manufactured by Shimadzu Corporation) equipped with a column "Agilent J&W GC Column DB-5" (manufactured by Agilent Technologies Inc.). The measurement condition was adopted such that the amount of the lignin-containing material was 1.0 μL; the helium flow rate was 14.1 mL/min; the injection port temperature was 300° C.; and the split ratio was 10/1. As for the temperature, after holding at 60° C. for 1 minute, the temperature was raised to 250° C. at a rate of 5° C./min and then held at 250° C. for 10 minutes. The quantitative determination was performed using a calibration curve prepared with respect to a peak area based on a concentration of respective reagents of three aldehydes including vanillin, syringaldehyde, and p-hydroxybenzaldehyde, thereby determining three aldehyde yields in the lignin-containing material.

The aldehyde yield (mass %) was calculated according to the following calculation equation (II) and defined as an index of the degree of denaturation of lignin. It is expressed that the higher the aldehyde yield, the lower in denaturation the lignin.

$$\text{Aldehyde yield (mass \%)} = (\text{Aldehyde yield of a sum of aldehyde amounts of vanillin, syringaldehyde, and p-hydroxybenzaldehyde})/(\text{Lignin mass in collected lignin-containing material}) \times 100 \quad (II)$$

(2) Calculation of Lignin Content (mass %), etc. in Lignin-Containing Material

The lignin content and the lignin mass in the lignin-containing material were calculated according to the following calculation equations (III) and (IV), respectively.

$$\text{Lignin content (mass \%)} = [\{\text{Acid-insoluble lignin content (mass \%)}\} + \{\text{Acid-soluble lignin content (mass \%)}\}] \quad (III)$$

$$\text{Lignin mass (g)} = [\{\text{Acid-insoluble lignin content (mass \%)}\} + \{\text{Acid-soluble lignin content (mass \%)}\}] \times \{\text{Collection amount of lignin-containing material (on a dry basis) (g)}\}]/100 \quad (IV)$$

Here, the acid-insoluble lignin content and the acid-soluble lignin content were calculated by the following methods.

(Calculation of Acid-Insoluble Lignin Content)

The acid-insoluble lignin content was calculated by subtracting an ash content in a crude acid-insoluble lignin according to the following calculation equation (V).

$$\text{Acid-insoluble lignin content (mass \%)} = \{\text{Crude acid-insoluble lignin content (mass \%)}\} \times [\{100\} \times [100 - \{\text{ash content (mass \%)}\}]/100 \quad (V)$$

(Calculation of Crude Acid-Insoluble Lignin Content)

A milled lignin-containing material was dried under vacuum at 60° C. 300 mg of this dried lignin-containing material was charged in a vial, 3 mL of 72% by mass sulfuric acid was added thereto, and the resulting mixture was appropriately stirred in a water bath at 30° C. for 1 hour. Thereafter, 84 mL of water was added thereto, and the resulting mixture was transferred into a pressure bottle and treated in an autoclave at 120° C. for 1 hour. Thereafter, the lignin-containing material was taken out before its temperature was dropped to 70° C. or lower, and subjected to suction filtration using a 1G-3 glass filter whose constant weight had been previously measured. The filtrate (A) was stored, whereas the glass filter attached with a residue was fully washed with water and then dried at 105° C., to measure a constant weight thereof, thereby determining the crude acid-insoluble lignin content (on a dry basis) according to the following calculation equation (VI).

$$\text{Crude acid-insoluble lignin content (mass \%)} = [\{\text{Mass of lignin-containing material residue (g)}\}]/\{\text{Collection amount of lignin-containing material (on a dry basis) (g)}\} \times 100 \quad (VI)$$

(Calculation of Ash Content)

The crude acid-insoluble lignin was transferred into a crucible whose constant weight had been previously measured, held therein at 575° C. for 12 hours, and then cooled to measure a constant weight of the crucible and determine a mass of the sample after ashing. The ash content was calculated according to the following calculation equation (VII).

$$\text{Ash content (mass \%)} = [\{\text{Mass of sample after ashing (g)}\}]/\{\text{Collection amount of crude acid-insoluble lignin (on a dry basis) (g)}\} \times 100 \quad (VII)$$

(Calculation of Acid-Soluble Lignin Content)

The acid-soluble lignin was measured by the following method, to calculate the acid-soluble lignin content.

The filtrate (A) was made up constant 100 mL and measured for an absorbance thereof at 205 nm using a double beam spectrophotometer (U-2910, manufactured by Hitachi High-Tech Science Corporation). At this time, the filtrate was appropriately diluted such that the absorbance thereof was 0.3 to 0.8.

Acid-soluble lignin content (mass %)=$d \times v \times (As-Ab)/(a \times w) \times 100$ Here, d: dilution ratio; v: constant volume (L) of filtrate; As: absorbance of sample solution; Ab: absorbance of blank solution; a: absorptivity coefficient of lignin; w: collection amount of sample (on a dry basis) (g).

As the absorptivity coefficient (a) of lignin, there was used 110 L/g/cm as the value described as the known average value in a reference document "Methods in Lignin Chemistry" supervisory translated by Junzo Nakano & Gyosuke Iidzuka (published by UNI Publishing Co., Ltd., 1994).

(3) Measurement of Weight Average Molecular Weight of Lignin

The weight average molecular weight of a lignin was measured through the gel permeation chromatography (hereafter also referred to as "GPC") under the following condition.

[GPC Operation]

100 μL of a solution having the concentration of 1 mg/mL, which was prepared by dissolving the lignin-containing material in an eluting solution, was used as a measurement sample. The molecular weight of the sample was calculated based on a calibration curve which had been previously prepared.

[GPC Condition]

Apparatus: HLC-8120GPC (manufactured by Tosoh Corporation) Detector: RI detector Separation column: Two columns of TSK-GEL α-M (manufactured by Tosoh Corporation)

Guard column: TSKgel guardcolumn α (manufactured by Tosoh Corporation)

Column temperature: 40° C.

Eluting solution: N,N-Dimethylformamide solution having 60 mmol/L of $H_3PO_4$ and 50 mmol/L of LiBr added thereto Flow rate of eluting solution: 1 mL/min Standard sample: Monodisperse polystyrene mixed solution A-500 (molecular weight: $5.0 \times 10^2$), F-10 (molecular weight: $9.64 \times 10^4$), and F-850 (molecular weight: $8.42 \times 10^6$), all of which are manufactured by Tosoh Corporation; and those monodisperse polystyrenes manufactured by Pressure Chemical Co. (molecular weights: $4.0 \times 10^3$, $3.0 \times 10^4$, and $9.29 \times 10^5$)

(4) Measurement of Sulfur Content in Lignin-Containing Material

The sulfur content in the lignin-containing material was measured and calculated by the ion chromatography using an automated combustion system as mentioned below.

[Analysis Operation]

About 0.02 to 0.05 g of the lignin-containing material was collected in a combustion board, and tungsten oxide was added thereto. A combustion operation was performed with an automated combustion system, and a sulfate ion was collected with an absorption solution (5 mL of 900 ppm hydrogen peroxide solution). The absorption solution was diluted with ion-exchanged water to make up constant 50 mL volume, thereby preparing a sample solution. The sample solution was measured by the ion chromatography, and the content of sulfur in the sample (conversion from sulfate ion: 0.3338) was calculated from the calibration curve.

[Operation Condition of Combustion System]

Apparatus: Automated combustion system AQF-100 [manufactured by Mitsubishi Chemical Corporation]

Maximum combustion temperature: 1,000° C.

Gas flow rate: Argon/oxygen: 200 mL/min, oxygen: 400 mL/min

Gas flow rate of water supply unit: Argon: 150 mL/min

[Ion Chromatography Operation Conditions]

Apparatus: ICS-1500 [manufactured by DIONEX Corporation]

Detector: Electric conductivity detector

Separation column: IonPac AS12A [manufactured by DIONEX Corporation]

Guard column: IonPac AG12A [manufactured by DIONEX Corporation]

Eluting solution: Mixed solution of 2.7 mmol/L sodium carbonate aqueous solution and 0.3 mmol/L sodium hydrogen carbonate aqueous solution (1/1)

Flow rate of eluting solution: 1.5 mL/min,

Suppressor: AERS 500 4-mm (recycle mode) [manufactured by Thermo Fisher Scientific Inc.]

Preparation Example 1

Preparation of Lignin-Containing Material B1

[Step (A-1)]

Sugar cone bagasse as a herbaceous biomass in a dry mass of 30 g was placed in a glass bottle, and a 1.6% by mass sodium hydroxide aqueous solution was added thereto such that the solid component concentration was 10% by mass. The glass bottle was heated in a constant-temperature bath at 95° C. for 6 hours (H-factor: 3.5).

[Step (A-2)]

The reaction product obtained in the step (A-1) was filtered under reduced pressure using a 400-mesh SUS mesh and a Nutsche filter. The residue was washed with 300 mL of ion-exchanged water at 90° C. to obtain a filtrate.

[Step (A-3)]

1.0 M hydrochloric acid was added to the filtrate to make it have a pH of 2.

The resultant suspension was centrifuged at 10,000 rpm for 20 minutes by using a centrifuge ("CR 20GIII", manufactured by Hitachi Koki Co., Ltd.). The supernatant was removed, 300 mL of ion-exchanged water was added to the residue, and after stirring, the resultant was again centrifuged, followed by water washing twice. The resulting precipitate was freeze-dried. Acetone was added to the resulting lignin, the mixture was stirred for 3 hours and extracted with a solvent. Thereafter, the resultant was subjected to solid-liquid separation using a filter paper ("Filter Paper No. 2", manufactured by Toyo Roshi Kaisha, Ltd.). The acetone was evaporated away under reduced pressure from the filtrate, to obtain a lignin-containing material B1.

The aldehyde yield of a lignin B1 in the resulting lignin-containing material B1 was 27.6% by mass, and the weight average molecular weight thereof was 1,700. The content of the lignin B1 in the lignin-containing material B1 was 93% by mass, and the sulfur content thereof was 0.085% by mass.

Example 1 and Comparative Example 1

(1) Preparation of Unvulcanized Rubber Composition

In each of compounding compositions shown in Table 1, the other components than zinc white, sulfur, and the vulcanization accelerator were kneaded in a 100-mL closed-type mixer ("Labo Plastomill R100", manufactured by Toyo Seiki Seisaku-sho, Ltd.) for 3 to 6 minutes, and when the temperature thereof reached 140 to 155° C., the kneaded mixture was discharged to obtain a rubber composition. Here, after the rubber composition was cooled to 50° C. or lower, zinc white, sulfur, and the vulcanization accelerator were subsequently added to the rubber composition and kneaded for 3 minutes, and when the temperature thereof reached 110 to 115° C., the kneaded mixture was discharged to obtain an unvulcanized rubber composition.

(2) Preparation of Vulcanized Rubber Test Piece for Evaluation of Grip Force The unvulcanized rubber composition obtained in the above (1) was filled in a frame surrounded by a SUS plate having a thickness of 3 mm and 11 cm×17 cm and vulcanized at 160° C., to prepare a vulcanized rubber. Using "Super Straight Cutter", manufactured by Dumbbell Co., Ltd., the resulting vulcanized rubber sheet was cut into a column-shaped test piece having a diameter of 6 mm and a thickness of 3 mm.

As for the vulcanization time for the test piece, a vulcanization time (T90) of the unvulcanized rubber at 160° C. was determined in conformity with the vulcanization test with a vibration type vulcanization machine described in JIS K6300-2, and the vulcanization was performed for a time calculated by multiplying T90 by 1.5.

(3) Evaluation of Grip Force (Wet Performance)

Using a static/kinematic friction measuring device ("TL201Ts", manufactured by Trinity-Lab. Inc.) and using a table sliding-type driving unit, the frictional force was measured.

At the test piece fixing site of the measuring unit of the static/kinematic friction measuring device, one side of the bottom surfaces of the vulcanized rubber test piece was fixed using an adhesive ("Aron Alpha EXTRA", manufactured by Toagosei Co., Ltd.), thereby bringing the bottom surface of the test piece having a diameter of 6 mm into contact with the measuring surface. As the measuring surface, s smooth surface of granite (20.5 cm×14.5 cm, thickness: 1 cm) fixed onto a slide table of a driving unit was used.

3 mL of ion-exchanged water was poured into a gap between the test piece fixing site and the granite, and the friction force was measured in a state that the entirety of the vulcanized rubber test piece was soaked in the ion-exchanged water. The maximum static frictional force and the average kinematic frictional force were measured under a measurement condition such that a measuring velocity was 30 mm/sec, a vertical load was 470 g, and a moving distance was 30 mm. While defining the frictional force of the rubber composition of Comparative Example 1 as 100, a maximum static frictional force index and an average kinematic frictional force index of each test piece were calculated according to the following calculation equation (VIII), to evaluate the grip force (wet performance). The results are shown in Table 1.

$$\text{Frictional force index} = [(\text{Frictional force})/(\text{Frictional force of Comparative Example 1})] \times 100 \quad \text{(VIII)}$$

The larger the frictional force index, the more excellent the grip force (wet performance) of the rubber is.

Details of each of the components shown in Table 1 are as follows.

[Rubber Component (A)]

TABLE 1

| | | | Example 1 | Comparative Example 1 |
|---|---|---|---|---|
| Blend of rubber composition (parts by mass) | Rubber component (A) | SBR/BR (80/20) *1 | 100 | 100 |
| | Lignin (B)-containing material | Lignin-containing material B1 *2 | 1 ** | — |
| | Amine compound (C) | Dimethyldodecylamine C1 *3 | 1 | — |
| | Inorganic filler (D) | Silica *4 | 40 | 40 |
| | Silane coupling agent (E) *5 | | 3 | 3 |
| | Anti-aging agent (F) | Nocrac NS-30 *6 (bisphenol-based compound) | 1 | 1 |
| | Additives | Stearic acid *7 | 1 | 1 |
| | | Process oil *8 | 5 | 5 |
| | | Zinc white *9 | 3 | 3 |
| | Vulcanizer | Sulfur *10 | 2 | 2 |
| | Vulcanization accelerator | SANCELER NS *11 | 1.5 | 1.5 |
| | Total amount (parts by mass) | | 158.5 | 156.5 |
| | Content of rubber (A) (% by mass) | | 63.1 | 63.9 |
| Evaluation results | Wet performance | Maximum static frictional force index | 125 | 100 |
| | | Average kinematic frictional force index | 150 | 100 |

** The lignin content in the lignin-containing material B1 (1 part by mass) is 0.93 parts by mass.

*1: A mixture of 80 parts by mass of SBR (styrene/butadiene random copolymer rubber having a styrene content of 23.5% by mass, manufactured by JSR Corporation, non-oil extended type, trade name: JSR1502) and 20 parts by mass of BR (butadiene rubber, manufactured by Zeon Corporation, trade name: NIPOL BR1220)

[Lignin (B)-Containing Material]

*2: Lignin-containing material B1 obtained in Preparation Example 1

[Amine Compound (C)]

*3: Dimethyldodecylamine C1

[Others]

*4: Precipitated silica (white carbon), manufactured by Tosoh Silica Corporation, trade name: NIPSIL VN3

*5: Bis(3-triethoxysilylpropyl)tetrasulfide, "Si69" manufactured by Degussa AG,

TABLE 1-continued

|  | Example 1 | Comparative Example 1 |
|---|---|---|

*6: Bisphenol-based anti-aging agent, 4,4'-butylidenebis(3-methyl-6-tert-butylphenol), "Nocrac NS-30", manufactured by Ouchi Shinko Chemical Industrial Co., Ltd.
*7: "Lunac S-70V", manufactured by Kao Corporation
*8: Naphthenic process oil, "SUNTHENE 410", manufactured by Japan Sun Oil Company, Ltd.
*9: "Zinc oxide, special grade", manufactured by FUJIFILM Wako Pure Chemical Corporation
*10: "Sulfur powder for chemical use", manufactured by FUJIFILM Wako Pure Chemical Corporation
*11: Sulfenamide-based vulcanization accelerator, N-tert-butyl-2-benzothiazyl sulfenamide, "SANCELER NS", manufactured by Sanshin Chemical Industry Co., Ltd.

Examples 2 to 14 and Comparative Examples 2 to 13

Rubber compositions were obtained in the same manner as in Example 1, except that in Example 1, the blending formulations of the lignin (B) and the amine compound (C) were changed as shown in Table 2 while not changing the kinds and amounts of the rubber component (A) (mixture of SBR and BR), the additives, and so on.

In Table 2, the frictional force index of each of the rubber compositions was calculated while defining the frictional force of Comparative Example 1 as 100.

Details of each of the components shown in Table 2 are as follows.

[Lignin (B)]

B1: Lignin B1 in the lignin-containing material B1 obtained in Preparation Example 1

The content of the lignin B1 in the lignin-containing material B1 (1 part by mass) is 0.93 parts by mass.

B2: Manufactured by Sigma Aldrich Corporation, sodium lignosulfonate "471038-100G", aldehyde yield: 11% by mass, weight average molecular weight: 52,000, Lignin content in the lignin-containing material B2: 85% by mass, sulfur content: 6.0% by mass The content of the lignin B2 in the lignin-containing material B2 (1 part by mass) is 0.85 parts by mass.

B3: Manufactured by Nacalai Tesque, Inc., lignin "20453-02", aldehyde yield: 8.7% by mass, weight average molecular weight: 11,000

Lignin content in the lignin-containing material B3: 60% by mass, sulfur content: 3.5% by mass The content of the lignin B3 in the lignin-containing material B3 (1 part by mass) is 0.60 parts by mass.

[Amine Compound (C), etc.]

C1: N,N-Dimethyldodecylamine
C2: N,N-Dimethylhexadecylamine
C3: N,N-Dimethyloctadecylamine
C4: Octadecyldiethanolamine
C5: N,N-Dimethyl-3-octadecyloxypropylamine
C6: Dioctadecylmethylamine
C7: 3-Dimethylaminopropyloctadecanamide
C8: Stearylamine
C9: Methylstearylamine
C10: Trimethyloctadecylammonium chloride
C11: Diazabicycloundecene
C12: N,N',N'-Tetramethylhexamethylenediamine

TABLE 2

|  |  | Rubber component (A) | | Lignin (B) | | Amine compound (C), etc. | | | Grip force (wet performance) | |
|---|---|---|---|---|---|---|---|---|---|---|
|  |  | Kind | parts by mass | Kind | parts by mass *1 | Kind | parts by mass | Mass ratio (C/B) | Maximum static frictional force index | Average kinematic frictional force index |
| Comparative | 1 | SBR + BR | 100 | — | — | — | — | — | 100 | 100 |
| Example | 2 | SBR + BR | 100 | B1 | 0.93 | — | — | — | 110 | 110 |
|  | 3 | SBR + BR | 100 | B1 | 7.44 | — | — | — | 113 | 93 |
| Example | 1 | SBR + BR | 100 | B1 | 0.93 | C1 | 1 | 1.08 | 125 | 150 |
|  | 2 | SBR + BR | 100 | B1 | 0.93 | C2 | 1 | 1.08 | 133 | 166 |
|  | 3 | SBR + BR | 100 | B1 | 0.93 | C3 | 1 | 1.08 | 129 | 195 |
|  | 4 | SBR + BR | 100 | B1 | 0.93 | C4 | 1 | 1.08 | 108 | 126 |
|  | 5 | SBR + BR | 100 | B1 | 0.93 | C5 | 1 | 1.08 | 114 | 133 |
|  | 6 | SBR + BR | 100 | B1 | 2.33 | C5 | 2.5 | 1.07 | 122 | 159 |
|  | 7 | SBR + BR | 100 | B1 | 2.33 | C6 | 2.5 | 1.07 | 118 | 128 |
|  | 8 | SBR + BR | 100 | B1 | 2.33 | C7 | 2.5 | 1.07 | 125 | 154 |
| Comparative | 4 | SBR + BR | 100 | B1 | 0.93 | C8 | 1 | 1.08 | 97 | 103 |
| Example | 5 | SBR + BR | 100 | B1 | 0.93 | C9 | 1 | 1.08 | 103 | 102 |
|  | 6 | SBR + BR | 100 | B1 | 0.93 | C10 | 1 | 1.08 | 92 | 99 |
|  | 7 | SBR + BR | 100 | B1 | 0.93 | C11 | 1 | 1.08 | 80 | 81 |
|  | 8 | SBR + BR | 100 | B1 | 0.93 | C12 | 1 | 1.08 | 83 | 100 |
| Example | 9 | SBR + BR | 100 | B1 | 0.47 | C3 | 0.5 | 1.06 | 114 | 154 |
|  | 10 | SBR + BR | 100 | B1 | 2.33 | C3 | 2.5 | 1.07 | 124 | 206 |
|  | 11 | SBR + BR | 100 | B1 | 3.72 | C3 | 1 | 0.27 | 127 | 179 |
|  | 12 | SBR + BR | 100 | B1 | 0.93 | C3 | 4 | 4.30 | 106 | 185 |
|  | 13 | SBR + BR | 100 | B2 | 0.85 | C3 | 1 | 1.18 | 129 | 142 |
|  | 14 | SBR + BR | 100 | B3 | 0.60 | C3 | 1 | 1.67 | 120 | 141 |
| Comparative | 9 | SBR + BR | 100 | B2 | 0.85 | — | — | — | 92 | 100 |
| Example | 10 | SBR + BR | 100 | B3 | 0.60 | — | — | — | 93 | 96 |
|  | 11 | SBR + BR | 100 | — | — | C3 | 0.5 | — | 97 | 103 |
|  | 12 | SBR + BR | 100 | — | — | C3 | 1 | — | 105 | 111 |
|  | 13 | SBR + BR | 100 | — | — | C3 | 8 | — | 67 | 101 |

*1: Amounts of the lignins B1 to B3 in the lignin-containing materials B1 to B3

Example 15

A rubber composition was obtained in the same manner as in Example 1, except that the blending composition of Example 3 was not changed, and the N,N-dimethyloctadecylamine was previously neutralized with stearic acid ("Lunac S-70V", manufactured by Kao Corporation) and then blended as an N,N-octadecylamine stearic acid salt. The wet performance of the obtained rubber composition was equal to that in Example 3.

From Table 2 and Example 15, it is noted that the rubber compositions of Examples 1 to 15 of the present invention are large in the maximum static frictional force and the average kinematic frictional force at the time of wetting and excellent in the grip force, as compared with the rubber compositions of Comparative Examples 1 to 13.

INDUSTRIAL APPLICABILITY

The rubber composition of the present invention is excellent especially in the grip force against the wet road surface, and therefore, it is especially useful for applications using the foregoing rubber composition, such as a shoe sole, a shoe, and a tire.

The invention claimed is:

1. A method of improving a frictional force of a rubber component, the method comprising:
    blending a rubber component (A), a lignin (B), and an amine compound (C) represented by formula (1):

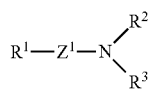

(1)

wherein:
    $R^1$ represents a hydrocarbon group or an acyl group each having 8 or more and 22 or less carbon atoms;
    $Z^1$ represents a single bond, $-OR^4-$, or $-NHR^5-$;
    $R^2$ represents a hydrocarbon group having 1 or more and 22 or less carbon atoms or $-(R^6O)_mH$;
    $R^3$ represents a hydrocarbon group having 1 or more and 4 or less carbon atoms or $-(R^7O)_nH$, provided that when $Z^1$ is a single bond, then $R^1$ is a hydrocarbon group; and
    $R^4$ and $R^5$ each independently represent an alkanediyl group having 2 or more and 6 or less carbon atoms;
    $R^6$ and $R^7$ each independently represent an alkanediyl group having 2 or more and 4 or less carbon atoms;
    m and n each represent an average addition molar number and are a number of more than 0; and
    (m+n) represents a number of 1 or more 30 or less.

2. The method according to claim 1, wherein a mass ratio [(C)/(B)] of the amine compound (C) to the lignin (B) is 0.1 or more and 10 or less.

3. The method according to claim 1, wherein the carbon number of $R^1$ is 10 or more and 22 or less.

4. The method according to claim 1, wherein $R^1$ is an alkyl group or an alkanoyl group.

5. The method according to claim 1, wherein $R^2$ and $R^3$ are each independently a methyl group or a 2-hydroxyethyl group.

6. The method according to claim 1, wherein $Z^1$ is a single bond or $-OR^4-$, and $R^1$ is a hydrocarbon group.

7. The method according to claim 1, wherein the amine compound (C) is at least one selected from the group consisting of N,N-dimethyldodecylamine, N,N-dimethyltetradecylamine, N,N-dimethylhexadecylamine, N,N-dimethyloctadecylamine, N,N-dimethyl-3-octadecyloxypropylamine, and octadecyldiethanolamine.

8. The method according to claim 1, wherein a weight average molecular weight of the lignin (B) is 500 or more and 100,000 or less.

9. The method according to claim 1, wherein an aldehyde yield of the lignin (B) according to an alkaline nitrobenzene oxidation method is 1% by mass or more.

10. The method according to any claim 1, further comprising:
    blending at least one selected from the group consisting of an inorganic filler (D), a silane coupling agent (E), and an anti-aging agent (F) therein.

* * * * *